Figure 1:
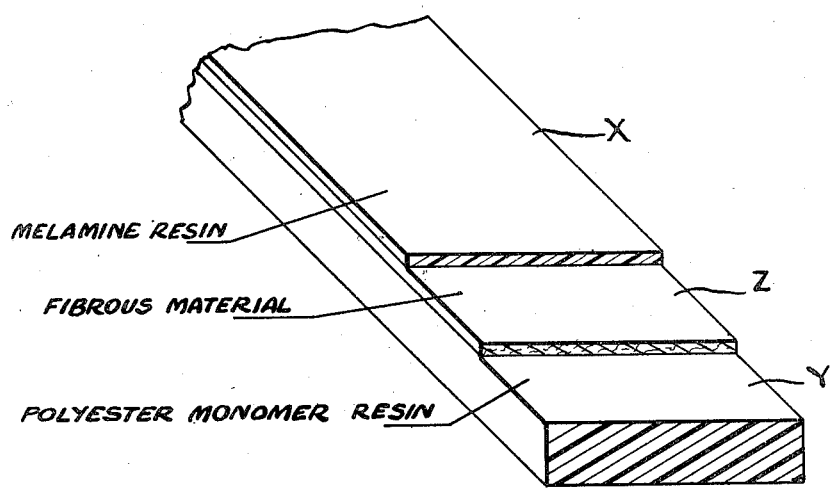

Nov. 6, 1956    C. H. HELBING    2,769,742
SURFACING RESIN BODIES
Filed April 29, 1952

INVENTOR.
CLARENCE H. HELBING
BY
Oscar L. Spencer
ATTORNEY

United States Patent Office 2,769,742
Patented Nov. 6, 1956

2,769,742

SURFACING RESIN BODIES

Clarence H. Helbing, Milwaukee, Wis., assignor to Pittsburgh Plate Glass Company, Allegheny County, Pa., a corporation of Pennsylvania Application April 29, 1952, Serial No. 285,045

8 Claims. (Cl. 154—120)

This invention relates to the manufacture of laminated articles of heat hardenable plastic and it has particular relation to the manufacture of laminated articles embodying a surface layer of very hard melamine-aldehyde resin bonded to a backing layer of a resin which is a copolymer of (A) polyester of an alpha-beta ethylenic dicarboxylic acid and (B) a compound containing a terminal $>C=CH_2$ group. It has been recognized that certain resins which are condensation products of triazine compounds containing the

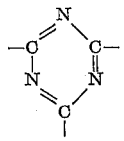

group, such as melamine and carbonyl compounds such as aldehydes and ketones, are of outstanding hardness, toughness and resistance to marring or abrasion. However, these types of resins are usually difficult to fabricate into finished articles because the formation of such articles normally requires the application of relatively high pressures which are difficult and expensive to obtain in the manufacture of many of the more conventional bodies such as laminates and the like.

On the other hand, certain other resinifiable materials and notably mixtures of (A) polyesters of glycols and alpha-beta ethylenic dicarboxylic acids and (B) liquid compounds of the monomer type which contain a terminal ethylenic $>C=CH_2$ group are capable of easy polymerization by addition reactions to form thermoset resin bodies without appreciable pressure in the operation. From the standpoint of ease and low cost of operation, these materials are very good. However, resins from these mixtures, while in many respects highly satisfactory, in certain other respects do not equal the performance of resins from the first mentioned types of materials. In particular, their resistance to scratching or marring is decidedly less than that of resins obtained by condensation of triazines and carbonyl compounds.

The present invention comprises the discovery that triazine-aldehyde resins of the type obtained by condensing melamine and formaldehyde and hereinafter designated composition X, can be laid down as films upon appropriate forming surfaces and liquid copolymerizable mixtures of (A) polyesters of alpha-beta ethylenically unsaturated dicarboxylic acids and glycols and (B) liquid compounds containing a terminal $>C=CH_2$ group hereinafter designated as material Y, can be applied thereto and the whole can be cured with little or no added pressure, to form solid coherent bodies. The major portion of the resin in the body comprises the readily formed copolymer of composition Y, the ethylenically unsaturated polyester and the ethylenically unsaturated compound containing the terminal $>C=CH_2$ group and only minor amounts of the melamine condensation product, but they are almost, if not quite, as scratch and mar resistant as bodies which are formed wholly of condensation products of triazines and aldehydes, e. g. melamine and formaldehyde (composition X).

In the practice of this invention, it is preferable to lay down a thin layer of a triazine-formaldehyde, resin (X) upon an appropriate surface which may be of glass, stainless steel, polished aluminum, or other hard, resistant impermeable material. Usually the surface should be as smooth as practicable. For forming laminates, it may be a plate, a revolving drum, or an endless band of smooth flexible material travelling upon appropriate supporting elements such as rollers or the like. Naturally the surface may be of such other formation as the character of the article to be formed may dictate.

Means should be provided for heating the surface, or the material which is deposited thereupon. Any conventional heating means is adequate. For example, ovens or tunnels provided with heating elements may be employed. The surface may be heated from below, for example, by irradiation or otherwise, or the material upon the surface may be heated by irradiation or convection from above or combinations of the methods of heating may be applied simultaneously or consecutively.

Figure 2:
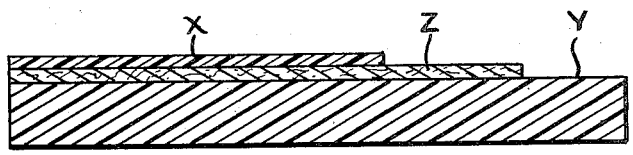

For a better understanding of the invention, reference may be had to the accompanying drawing in which:

Fig. 1 is a perspective view of a laminate prepared in accordance with the provisions of this invention, but with certain of the plies partially sectioned away; and Fig. 2 is a sectional view of the construction shown in Fig. 1.

In the drawing, like numerals refer to like parts throughout.

A laminate embodying the features of this invention as shown in the drawings, includes a base or body layer Y, which preferably comprises a copolymer or interpolymer of (A) a polyester of a glycol and a polybasic carboxylic acid or mixture of such acids, at least a part of which are alpha-beta ethylenic dicarboxylic acids, and (B) a monomer containing a $>C=CH_2$ group. A layer Z comprises fibrous material such as paper, or glass fibers in the form of a mat, or a woven sheet, which is adherent to, or partially embedded in, layer Y. Layer Z is covered by and adherent to, or partially impregnated by, a layer X of melamine or urea resin. The layer Z may also be adhered to one or both of the layers X and Y by a special adhesive composition. These several elements and the mode of assembling them will be more fully commented upon hereinafter.

In the formation of composite bodies in accordance with the provisions of the present invention, a conventional or commercial melamine-formaldehyde condensation product which may be employed as X is sold under the trade name "Uformite MM55." Many melamine-formaldehyde compositions or compositions containing melamine or formaldehyde in substantial amount are disclosed in Patent 2,197,357.

Water soluble melamine-formaldehyde resins such as are hereinafter described are of particular value in forming the improved coatings. In most instances the melamine-formaldehyde condensation product will be applied while in a water soluble stage of reaction. Melamine compositions soluble in organic solvents such as xylene, toluene, xylene-butanol mixtures, ethyl alcohol, butyl alcohol, glycerine, benzyl alcohol acetone, etc. are included. Naturally some organic solvents will also dissolve some of the water soluble melamine-formaldehyde condensation products.

Mixed melamine-aldehyde resins including modifiers such as cellulose acetate, cellulose ethers, urea-formaldehyde resins and others are included in this invention, though it also includes unmodified resins.

The invention includes the deposition of preformed solid films of the resin X in a state of cure short of the final completely insoluble condition, or a web or sheet of fibrous material coated or impregnated with resin X or syrup. However, it is usually desirable to spread upon the supporting surface composition X as a liquid. The concentration of the solution may vary dependent upon the thickness of the film to be formed, the number of coatings of material X that may be applied and other factors involved in individual operations. Normally, a solution of such concentration as to obtain a syrup-like consistency is desirable. These syrups can readily be applied by conventional methods such as brushing, roller coating, or spreading with a doctor blade or in some case, by dipping or pouring methods. The solution will be applied in such thickness as will admit of ready evaporation of the solvent therefrom. If thicker films of composition X are desired, several applications of solution may be made, with evaporation of solvent between applications.

While the present invention includes the pouring or casting of copolymerizable mixtures of (A) polyesters of alpha-beta ethylenic dicarboxylic acids and (B) compounds containing the $>C=CH_2$ (composition Y) group in immediate and direct contact with the melamine-formaldehyde composition, it is more usual to incorporate an intermediate sheet or layer of a material which usually is of fibrous or porous nature between the two types of material. For example, the intermediate layer may be in the form of a thin, tough sheet or paper composed of cellulosic fibers or a sheet of glass fibers or of asbestos fibers. Such sheet is laid down in the composition X while it is still liquid. Subsequently the solvent in the composition X is evaporated to provide the solid melamine-formaldehyde resin. The fibrous sheet is of considerable value inasmuch as it has been found substantially to reduce shrinkage and distortion of the laminate.

The liquid composition of polyester and compound containing the $>C=CH_2$ group (composition Y) is then applied to the back of the paper or fibrous sheet.

Application of the latter composition may be effected by pouring or otherwise spreading the resin, as a liquid body. Such process applies to forming articles by casting. A more usual procedure, however, involves the application of one or more sheets of fibrous material such as paper, asbestos or fiber glass impregnated with or coated with, the copolymerizable mixture of the alpha-beta ethylenically unsaturated polyester and the compound containing the $>C=CH_2$ group.

A large number of copolymerizable mixtures of (A) alpha-beta ethylenically unsaturated polyesters and (B) compounds containing the group $>C=CH_2$ have been disclosed in the prior art and many of these are available commercially. The present invention includes the use of many if not all, of these conventional polyesters and polyesters which are equivalent thereto. Appropriate polyesters are obtained by condensing or esterifying such alpha-beta unsaturated dicarboxylic acids as maleic acid, fumaric acid, itaconic acid, and derivatives thereof containing a functioning ethylenic group, with appropriate glycols such as ethylene glycol, diethylene glycol, polyethylene glycol, propylene glycol and the like. Those dicarboxylic acids in which both the unsaturation and the carboxyls are in the alpha-beta position are presently preferred. In many instances, the polyesters also include dicarboxylic acids which are free of ethylenic groups or other functioning groups than the two dicarboxyls. For example, the polyesters may include a portion of phthalic acid or an aliphatic dicarboxylic acid such as succinic acids, adipic acid, sebacic acid or the halogenated derivatives thereof such as tetrachlorophthalic acid. These acids free of ethylenic unsaturation may be employed in a wide range of proportions, for example, the proportion may be as low as, or even lower than 0.25 mole of the latter acid per mole of the ethylenically unsaturated acid. On the other hand, the proportion of the dicarboxylic acid free of ethylenic unsaturation may be relatively great, for example 6, 8, 10, or even 12 moles per mole of the ethylenically unsaturated acid.

It will be understood that additions of higher fatty acids such as stearic acid, oleic acid, linoleic acid, linolenic acid, elaeosteric acid, and similar higher fatty acids may be included. These acids may be incorporated in a proportion of about $1/10$ or $1/12$ mole per mole of the dicarboxylic acids.

In the preparation of the polyesters, the glycols are usually employed in approximately equi-molar ratio or in a slight excess thereof with respect to the total of the available carboxyls of the acids in the reaction mixture.

From the examples to follow, it will be apparent that the polyesters of the ethylenically unsaturated dicarboxylic acids may also include a certain amount of a polyhydric alcohol such as pentaerythritol, sorbitol, mannitol or the like. In general, these polyhydric alcohols will include from 4 to 6 hydroxyls usually attached to a hydrocarbon group. This type of polyester resin is designated as $Y_b$. The polyhydric alcohol will constitute about $1/20$ to about $1/5$ of the total of the alcoholic components of the polyester.

For purposes of distinction, this type of resin will be designated as $Y_b$. It has exceptionally high cohesion to resins of the type of X. The material containing polyesters free of alcohols containing more hydroxyls than a glycol are distinguished as $Y_a$. The term Y includes $Y_a$ and $Y_b$.

While the backing resin Y can consist of a single type of material, namely, one ($Y_a$) consisting of (A) polyester of a glycol and an appropriate dicarboxylic acid or acids, and (B) ethylenic compound, or it can be ($Y_b$) such composition containing a polyhydric alcohol component, it will be appreciated that in many instances it is desirable to include a plurality of different polyesters in the base or backing layers of the bodies. For example, a base layer may contain a bonding or bank layer of $Y_b$ contiguous to the surface layer of X and the rest of backing may be of $Y_a$.

The preparation of the alpha-beta ethylenically unsaturated polyesters employed in the practice of the present invention follows essentially conventional techniques. Many patents and citations disclosing such methods are available in the prior art. Broadly speaking, however, such polyesters may be prepared by admixing the several acid components of the polyester in proportions within the above indicated ranges, with a glycol or a mixture of a glycol and a polyhydric alcohol, with or without esterification catalysts and then heating the resultant esterifiable mixture until water of reaction is evolved and esterification takes place. Usually the heating operation is conducted under a blanket of inert gas such as carbon dioxide in order to prevent undue oxidation of the reactants. The reaction may be conducted within a temperature range of about 150 to 225° C. The reaction is continued so long as water of reaction is evolved, or until a relatively low acid value, e. g. about 10 to 50, is attained. The completion of the reaction can be ascertained by withdrawal of small samples from the reaction mixture from time to time and subjecting them to conventional acidity and/or viscosity tests as is well understood by those skilled in the art. Usually the cooking of the polyester is continued until it is very viscous or even solid at room temperature. However, it is still fusible and soluble.

If pentaerythritol or like polyhydric component is to be incorporated, it is merely added to the polyester as a substitute for a portion of the glycol component and the mixture is esterified in substantially the above manner.

In order to form a copolymerizable mixture $Y_a$ or $Y_b$ suitable for forming laminated bodies in accordance with the provisions of the present invention, an appropriate ethylenic compound containing the terminal $>C=CH_2$ group, usually attached to a negative group, should be employed. These compounds are usually liquid, soluble in the polyester and are adapted, by reason of these characteristics, to dilute the polyester component and thus to render it more fluid. The ethylenic compounds are often inherently polymerizable to form resinous compositions which are linear polymers and which usually are thermoplastic. Appropriate monomers include styrene, or styrene like compounds, such as styrene per se, alpha-methyl styrene, divinyl benzene, vinyl toluene and the like. Still another type of compounds including the $>C=CH_2$ group and being appropriate for use in the preparation of copolymerizable mixtures employed in the practice of the present invention, include esters of various carboxylic acids and ethylenically unsaturated alcohols such as vinyl alcohol and allyl alcohol. These esters include diallyl phthalate, diallyl sebacate, diallyl succinate, divinyl pythalate, allyl acetate, vinyl acetate, vinyl propionate and the like. Likewise, acids containing the $>C=CH_2$ group may be reacted with saturated and unsaturated alcohols to provide esters which may be conjointly polymerized with the polyesters above described. Such ethylenically unsaturated acids include acrylic acid, methacrylic acid and the like. Still other compounds including an appropriate $>C=CH_2$ group include diallyl ether or similar ethers, vinyl chloride, vinylidine chloride, acrylonitrile and the like.

In order to prepare copolymerizable mixtures Y, e. g. $Y_a$ or $Y_b$ of ethylenically unsaturated polyesters and compounds containing the $>C=CH_2$ group for use as the backing or base resin of the composite bodies constituting the subject matter of the present invention, considerable variation in the proportions of the components (polyesters and ethylenically unsaturated compound) are contemplated. For example, the proportion of the compound containing the $>C=CH_2$ group may be as low as about 5% with respect to the polyester component. On the other hand, it may be as high as 50 or even 100% by weight with respect to the polyester. In any event, it will be appreciated that the component containing the $>C=CH_2$ group should be employed in such proportion that mutual compatibility or solubility of the two components of the resinifiable mixture are attained.

Since as above stated, the polyester components constituting the subject matter of the present invention are often relatively viscous substances, or even solids, in order to incorporate the compound containing the $>C=CH_2$ group, it is usually desirable or necessary to effect the incorporation while the mixture is fairly warm, e. g. at a temperature of about 90 to 120° C. At these temperatures, the mixtures are often characterized by a strong tendency prematurely to gel or set. In order to obviate this tendency, it is customary to include in one of the components of the copolymerizable mixture, e. g. the polyester, an appropriate inhibitor of gelation or prepolymerization. Such inhibitors include tertiary butyl catechol, diisopropyl catechol, hydroquinone, quaternary ammonium salts such as trimethylbenzyl ammonium chloride and many others which per se do not constitute a feature of the present invention.

When the copolymerizable mixtures $Y_a$ or $Y_b$ are to be employed in the formation of composite bodies in accordance with the provisions of the present invention, it is customary to add an appropriate catalyst of heat polymerization. These include the various conventional organic peroxides and hydroperoxides such as benzoyl peroxide, lauroyl peroxide, tertiary butyl hydroperoxide and many others. These are added in appropriate amounts, e. g. .1 to 5% by weight based upon the copolymerizable mixture.

In order to form composite articles embodying a supporting base of resin Y and a hard, durable facing layer of melamine-aldehyde condensation products (resin X), a preferred procedure, as a first step, involves applying a layer of the latter resin to a surface such as a plate of metal, glass or the like. Naturally the surface may have any appropriate contour in accordance with the shape of the article to be formed. A solution, e. g. an aqueous solution or syrup of the composition X may be laid down upon this surface by brushing, roller coating, spraying or any other convenient technique. The final films may be relatively thin, e. g. of the order of 0.5 to 1¼ or 2 microns or they may be substantially thicker for example, of the order of a 1/32 or 1/16 of an inch. To attain such thickness, it may be necessary to make several applications of the resin solution. Between such applications, the solvent, such as water or an organic solvent or a mixture of both, will be evaporated.

The copolymerizable mixture Y may be applied in immediate contact with the film of resin X upon the supporting surface. However, a technique which is often more useful involves the application of an intermediate layer of a fibrous material such as a sheet Z of thin, relatively tough paper, fiber glass, asbestos, or the like. The sheet may be of felted or randomly disposed fibers or it may be composed of fibers spun into thread and woven into a definite fabric. The sheet reduces shrinkage and any tendency of the film to warp or distort as it drys or sets. In applying such sheets to the film of composition X a convenient procedure involves applying one or a plurality of layers of a liquid or syrup of the latter to the supporting surface and then while at least the exposed surfaces of the latter are still in liquid state, pressing the fibrous sheet upon or into the liquid. The latter at least partially impregnates the fibrous materials so that the individual fibers are at least partially, or even completely imbedded in and coated by them. The resin is then dried, and if desired, may be baked to such an extent as to carry the polymerization of the material to a more advanced state. The elimination of any solvents that may be present in the resin X is desirable, inasmuch as it is difficult to remove the latter after the resin Y has been applied. The resins $Y_a$ or preferably $Y_b$ contact with and may partially impregnate the fibrous sheet from the back so that a very strong union between resins X and Y is obtained.

The present invention includes the direct pouring of mixture Y upon the melamine-aldehyde film or upon such film appropriately backed with fibrous material. The mixture Y may comprise a liquid layer of substantial thickness, in which case it is necessary to provide some means marginally to confine the liquid materials until they gel. To this end, the film of composition X may be laid down upon the bottom or other appropriate side of the mold and the mold may then be partially or completely filled with the mixture Y. In many instances, however, it is desirable to form laminates by the application of a plurality of sheets of fibrous material such as sheets of cellulose fibers, asbestos or glass fibers either in matted or woven state and pre-impregnated with composition Y. The latter composition may be introduced into the fibrous sheets by pre-dipping or otherwise coating and/or impregnating such sheets. The sheets impregnated with materials $Y_a$ or $Y_b$ can be laid directly on the paper layer in resin X, or an intermediate bank of resin $Y_b$ can be spread and then the sheets containing $Y_a$ or $Y_b$ can be laid up. The copolymerizable mixtures Y in or upon the fibrous sheets, naturally should include such polymerization catalysts and/or other modifiers as may be required to impart desired curing or other properties to the material. As many sheets of polyester-ethylenically unsaturated compound impregnated material as may be required to attain desired thickness, may be laid up upon the melamine-aldehyde film.

For purposes of improving the smoothness of the back of the polyester-ethylenically unsaturated compound copolymer, an appropriate backing layer such as a sheet of cellophane or other thin film of plastic having but little or no adhesion to the cured film, may be employed upon the top of the sandwich. However, this sheet is not in all instances required.

For purposes of curing the composite bodies, the latter may be subjected to heat for example, by conduction or by irradiation from a source such as a bank of heat lamps or the like.

Sandwiches or laminates assembled in the manner described may be cured at a temperature of about 90 to 200° C. in order to cure both resins X and Y. The time of cure will usually be within a range of 5 to 10 minutes up to about one hour dependent somewhat upon the rate of cure of the materials employed, the thickness of the laminate and the final degree of hardness desired in the material. Any reasonable period of time that will produce a satisfactory degree of hardness is included by the invention. Prolonged heating after completion of the cure is admissible.

In the completed articles as obtained by the process, the melamine-aldehyde overlays or surface films are firmly bonded or united to the copolymer of polyester and ethylenically unsaturated compound constituting the base. The surfaces of such composite bodies are almost as hard and mar resistant as if the bodies were formed completely of melamine-aldehyde plastic. Yet these structures can be formed readily without application of any appreciable pressure. At the same time, the copolymerizable mixtures of polyester and ethylenically unsaturated compound constituting the major portion of the bodies is relatively inexpensive to obtain.

The following examples illustrate the application of the principles of the invention.

*Example I*

In the example, a polyester was employed which comprised a mixed ester of 9 moles of maleic acid and 11 moles of phthalic acid. This was esterified with a slight excess of propylene glycol. This polyester was admixed in a proportion of 60 parts by weight with styrene in a proportion of 25 parts by weight. This constituted the main body of the backing resin and is a $Y_a$ type material.

A second polyester composition was then prepared comprising maleic anhydride esterified with diethylene glycol in a proportion of 0.55 mole, propylene glycol in a proportion of 0.44 mole and a commercial pentaerythritol composition known commercially as "Pentek" in a proportion of 0.11 mole. Moles as expressed, of course, are per mole of maleic anhydride. The polyester while warm was admixed with 0.01% by weight upon the basis of the total resin Y of diisopropyl catechol constituting an inhibitor of gelation or pre-polymerization. To the warm and liquid mixture was added 18% by weight of styrene based upon the polyester. This is a $Y_b$ type material especially suitable for use as a banking resin.

In the preparation of a melamine-formaldehyde resin X suitable for use as an overlay or surface layer, 105 grams of melamine, 50 grams of urea, 30 grams of diglycol carbamate, 364 grams of methanol free formaldehyde of a concentration of 37% and 85 grams of methanol were heated to refluxing temperature under an appropriate condenser for 45 minutes. One hundred eight grams of the resultant syrup was then admixed with 60 grams of hydroxyethyl cellulose and 2.4 milliliters of dibasic ammonium phosphate solution containing ammonium phosphate in a proportion of 20 grams per 100 milliliters of solution.

The foregoing overlay solution was brushed upon a clean, stainless steel plate and a thin paper sheet known commercially as "Skintex 92" was laid down in the wet resin and the film was dried for 20 minutes at 170° F. and ten minutes at 200° F. Intermediate or "bank" resin $Y_b$ containing 1.5% by weight of benzoyl peroxide was spread upon the back of the "Skintex 92" sheet in order to assure thorough bonding between the base resin and the overlay resin. Previously a number of sheets of alpha-cellulose fibers were soaked in a portion of the first mentioned copolymerizable mixture of polyester and ethylenically unsaturated compound, $Y_a$, containing one percent by weight of benzoyl peroxide. Four sheets of the soaked alpha-cellulose fibers were so assembled with bank resin applied between and the whole was then covered with a sheet of "cellophane" and rolled to a smooth, coherent state. The resultant sandwich was cured for 20 minutes in an oven at a temperature of 170° F. and subsequently for 15 minutes at a temperature of 250° F. Curing is effected without added pressure or under very slight pressure. However, the invention includes application of substantial pressure, if so desired. The cured laminate may be stripped from the panel. The several plies of material were uniformly and thoroughly cohered together into a unitary structure in which the melamine-formaldehyde resin provided a hard, smooth and highly mar resistant surface film upon a backing containing the polyesterethylenically unsaturated compound as a binder.

*Example II*

It is admissible to employ melamine-formaldehyde resins which do not include urea. For example: Admix 25 grams methyl cellulose of 25 centipoise viscosity, with 300 grams of water at 85° C. and add 300 grams of additional water while the mixture is at or attains a temperature of 60° C. To this mixture add 126 grams of melamine and 324 grams of formalin (37% formaldehyde). Such addition can be effected while the temperature is maintained at 50° C. The mixture is heated to a temperature of 80 to 91° C. for approximately 30 minutes. The product can be mixed with water to any desired dilution without precipitation. It is a water soluble resin.

The water soluble resin may be poured upon a panel of polished metal and baked for 40 minutes at 71° F. with or without preliminary application of a fibrous sheet. A bonding layer of copolymerizable material ($Y_b$ in Example I) is applied and a plurality of layers of cellulose fibers impregnated with resin $Y_a$ are laid up as in Example I. This laminate can be covered with a sheet of "cellophane" and the laminate can be cured by heating it for one hour at 120° C. and then for 30 minutes at 150° C. The laminate may then be removed from the panel.

Resultant laminates have very hard, mar resistant surfaces.

*Example III*

Eliminate ethyl cellulose or replace it by other dispersing agent in Example II and proceed as in the latter example.

*Example IV*

While melamine-aldehyde resins are of outstanding merit in forming hard durable surface films or backings for copolymers of (A) alpha-beta ethylenically unsaturated polyesters and (B) ethylenically unsaturated compounds containing >C=CH₂ groups, the invention further includes the replacement of all or a major portion of the melamineformaldehyde resin in the surface layer by an urea-formaldehyde resin. The surfaces of the products may not be so hard and mar resistant as those embodying melamine-formaldehyde as the major component, but they are still very hard and for many purposes are satisfactory. The preparation of one such laminate proceeds as follows:

The surfacing resin is of the composition:

| | |
|---|---|
| Urea formaldehyde resin [1] | grams__ 23 |
| Hydroxyethyl cellulose [2] | do____ 10 |
| Dibasic ammonium phosphate [3] | milliliter__ 0.1 |

[1] The resin is a commercial water soluble product known as "Uformite" 471.
[2] The hydroxyethyl cellulose is water soluble.
[3] The dibasic ammonium phosphate is a catalyst.

The above composition is dissolved or dispersed in water and is spread on a stainless steel panel in an amount to provide a film of desired thickness. A sheet of fibrous material, e. g. "Skintex 92" is deposited in the wet film and the film is baked at 75° C. for 20 minutes and then at 95° C. for 10 minutes.

A film of intermediate banking resin is laid down upon the surface film. The banking resin consists of (A) 90% by weight of polyester containing pentaerythritol as in Example I and (B) 10 percent by weight of styrene. It is catalyzed with 1.5% based on the mixture of benzoyl peroxide and is inhibited against premature polymerization by 0.01% by weight (based upon the polyester of the bank resin) of diisopropyl catechol.

On the banking layer, 4 sheets of alpha cellulose and 1 of printing paper, each impregnated with a copolymerizable mixture of (A) a polyester and (B) an ethylenic compound are deposited. The copolymerizable mixture comprises 60 parts by weight of a polyester and 25 parts by weight styrene. The polyester is formed by reacting a mixture containing maleic anhydride in a ratio of 9 moles and phthalic anhydride in a ratio of 11 moles with propylene glycol in slight excess of stoichiometric proportion with respect to the anhydride. The copolymerizable mixture contains 1% by weight of benzoyl peroxide (copolymerization catalyst) and if desired, a small amount of inhibitor.

The sandwich is cured by baking for 25 minutes at 75° C. and for 15 minutes at 120° C. It can then be stripped off the panel and baked a further period of 15 minutes at the same temperature.

I claim:
1. A method of forming a laminated body which comprises spreading a syrup of a condensation product of an aldehyde and a compound of a class consisting of a triazine and urea upon a smooth impermeable supporting surface, drying the syrup to a solid state, applying a layer of a polymerizable mixture of a compound containing the group >C=CH₂ and a polyester of an alpha-beta dicarboxylic ethylenically unsaturated acid, and curing the sandwich upon the surface to a hard, coherent state and stripping off the laminate.

2. In a method of forming a coherent laminate embodying (I) a supporting base structure of a copolymer of (A) a compound containing a >C=CH₂ group and (B) a polyester of an alpha-beta ethylenic, alpha-beta dicarboxylic acid and a glycol and (II) an overlay layer of a condensation product of an aldehyde and melamine, the steps which comprise applying a film of a liquid solution of said condensation product to a smooth solid surface, drying the solution and superposing on the dried material, a liquid mixture of said compound containing the group >C=CH₂ and the polyester and heating the laminate in order to cure the whole into a solid, coherent state and stripping off the laminate from the supporting surface.

3. In a method of forming a laminated body, the steps of applying to a liquid solution of melaminealdehyde condensation product upon a smooth, impermeable supporting surface, a fibrous backing layer and contacting said layer with a solution of a copolymerizable mixture of (A) a compound containing the group >C=CH₂ and (B) a polyester of a glycol and a dicarboxylic acid component, at least one mole in ten of said component being alpha-beta ethylenically unsaturated and curing such solution to a hard durable state and stripping off the laminate from the supporting surface.

4. The steps as defined in claim 3 in which the polyester includes a polyhydric alcohol component of four to six hydroxyl groups.

5. The steps as defined in claim 3 in which the polyester includes pentaerythritol.

6. A method of forming a laminated body having a smooth, hard, mar-resistant surface, comprising the steps of laying down on a smooth, impermeable, supporting surface a film of a melamine resin, pressing into the film a sheet of fibrous material, baking the film, applying to the back of the fibrous sheet a bonding layer of a mixture of a monomer containing a >C=CH₂ group and a polyester comprising an alpha-beta ethylenically unsaturated acid, a glycol, and pentaerythritol, applying upon the bonding layer a layer of a fibrous sheet impregnated with a mixture of a monomer containing a >C=CH₂ group and a polyester comprising a glycol and an alpha-beta ethylenic dicarboxylic acid, curing the laminate by application of heat, and stripping it from the supporting surface.

7. The method as defined in claim 6 in which the alpha-beta ethylenic dicarboxylic acid, in each instance, is maleic acid.

8. The method of claim 7 in which the monomer, in each instance, is styrene.

References Cited in the file of this patent
UNITED STATES PATENTS 2,255,313    Ellis ------------------ Sept. 9, 1941
2,602,037    Nelb ------------------ July 1, 1952